(12) United States Patent
Noguchi et al.

(10) Patent No.: US 11,085,850 B2
(45) Date of Patent: Aug. 10, 2021

(54) MULTI-DEGREE MONITORING APPARATUS

(71) Applicant: Mitsubishi Electric Corporation, Tokyo (JP)

(72) Inventors: Yuita Noguchi, Tokyo (JP); Naoki Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/966,210

(22) PCT Filed: Feb. 23, 2018

(86) PCT No.: PCT/JP2018/006714
§ 371 (c)(1),
(2) Date: Jul. 30, 2020

(87) PCT Pub. No.: WO2019/163093
PCT Pub. Date: Aug. 29, 2019

(65) Prior Publication Data
US 2021/0048369 A1 Feb. 18, 2021

(51) Int. Cl.
*G01M 11/00* (2006.01)
*H04B 10/071* (2013.01)

(52) U.S. Cl.
CPC .... *G01M 11/3136* (2013.01); *G01M 11/3145* (2013.01); *G01M 11/3154* (2013.01); *H04B 10/071* (2013.01)

(58) Field of Classification Search
CPC .... H04B 10/07; H04B 10/071; H04B 10/073; H04B 10/0731; H04B 10/075;
(Continued)

(56) References Cited

U.S. PATENT DOCUMENTS 7,257,325 B1 * 8/2007 Barbarossa ........ H04B 10/0795
398/12
9,647,793 B2 * 5/2017 Fujita ................ H04B 10/506
(Continued)

FOREIGN PATENT DOCUMENTS

JP 11-237306 A 8/1999
JP 2002-44032 A 2/2002
(Continued)

OTHER PUBLICATIONS

International Search Report, issued in PCT/JP2018/006714, PCT/ISA/210, dated May 15, 2018.

*Primary Examiner* — Gordon J Stock, Jr.
(74) *Attorney, Agent, or Firm* — Birch, Stewart, Kolasch & Birch, LLP

(57) ABSTRACT

There are included: a light source (11) that outputs pulsed light; an optical splitter (12) that splits the pulsed light output from the light source (11) and outputs the split pulsed light from each of a plurality of second ports; a plurality of VOAs (13) that is each connected to a corresponding one of the second ports of the optical splitter (12), and attenuates and outputs the pulsed light input from the optical splitter (12); a plurality of optical couplers (14) each of whose first port is connected to output of a corresponding one of the VOAs (13) and each of whose second port is connected to one end of a corresponding one of a plurality of transmission lines (2) to be measured; a light receiving element (15) that receives backscattered light from the one end of each of the transmission lines (2); a power adjustment unit (16) that individually controls each of the VOAs (13); and a data processing unit (17) that performs abnormality detection on each of the transmission lines (2) from a result of light reception by the light receiving element (15).

3 Claims, 7 Drawing Sheets

(58) Field of Classification Search
CPC .............. H04B 10/077; H04B 10/0771; H04B
10/0773; H04B 10/0775; H04B 10/0777;
H04B 10/0779; H04B 10/079; H04B
10/0791; H04B 10/0793; H04B 10/0795;
H04B 10/07951; H04B 10/07953; H04B
10/07955; G01M 11/30; G01M 11/31;
G01M 11/3109; G01M 11/3118; G01M
11/3127; G01M 11/3136; G01M 11/3145;
G01M 11/3154; G01M 11/3163; G01M
11/3172; G01M 11/3181; G01M 11/319
See application file for complete search history.

(56) References Cited

U.S. PATENT DOCUMENTS

| | | | | |
|---|---|---|---|---|
| 9,847,831 | B2* | 12/2017 | Archambault | H04Q 11/0062 |
| 10,411,796 | B1* | 9/2019 | Archambault | G01M 11/3127 |
| 10,432,306 | B2* | 10/2019 | Eiselt | H04B 10/07955 |
| 2009/0027656 | A1 | 1/2009 | Zhang et al. | |

FOREIGN PATENT DOCUMENTS

| | | |
|---|---|---|
| JP | 2010-185762 A | 8/2010 |
| JP | 2010-534855 A | 11/2010 |
| JP | 2013-134138 A | 7/2013 |
| JP | 2014-3439 A | 1/2014 |
| JP | 2015-64383 A | 4/2015 |

* cited by examiner

MULTI-DEGREE MONITORING APPARATUS

TECHNICAL FIELD

The present invention relates to a multi-degree monitoring apparatus that monitors a plurality of transmission lines.

BACKGROUND ART

The increase in capacity of information communication has been achieved by a wavelength division multiplexing (WDM) optical communication system. In recent years, there has been an increasing demand for improved reliability of communication paths and communication devices, and for network flexibility to optimize a network configuration depending on demand. To meet these demands, a multi-degree WDM system compatible with mesh topology has been put to practical use.

When an optical fiber is used as a transmission line, it is required that a loss due to connector connection and a loss due to fiber fusion splicing in the transmission line fall within an allowable range of communication performance. Moreover, when the optical fiber breaks due to an external factor such as a natural disaster, the location of the break needs to be identified in order to restore the system.

The locations of the excess loss and the break in the transmission line are typically identified using an optical time domain reflectometer (OTDR). The OTDR inputs pulsed light to the transmission line and measures a temporal change in the intensity of backscattered light that is generated when the pulsed light propagates through the transmission line. The change in the intensity of the backscattered light increases at reflection points being the locations of the excessive loss and the break in the transmission line. The OTDR can thus calculate the distance to the reflection point from the temporal change in the intensity of the backscattered light, the speed of the pulsed light, and a group refractive index of the optical fiber.

Moreover, a plurality of transmission lines exists in the case of the multi-degree WDM system. Meanwhile, as in Patent Literature 1, for example, a method has been proposed in which an optical switch appropriately switches transmission lines to be connected to one OTDR and the OTDR performs measurement on the switched transmission line.

CITATION LIST

Patent Literature

Patent Literature 1: Japanese Laid-Open Patent Application No. 2015-64383

SUMMARY OF INVENTION

Technical Problem

Conventionally, when a new transmission line is laid or an abnormality occurs in a transmission line, a worker carries one OTDR to the site, so that the OTDR performs measurement on the transmission line. Thus, when a plurality of transmission lines exists, the worker repeats connection of one OTDR for each transmission line, and the OTDR performs measurement for each transmission line. When one OTDR is used as described above, the connection and measurement of the OTDR for each transmission line need to be repeated, which causes a problem that an increase in duration of installation checking work and an increase in duration of recovery are remarkable.

It is also conceivable to provide the OTDRs as many as the number of the transmission lines in order to reduce the measurement time. However, in this case, there is a problem that the cost increases as the number of the OTDRs increases.

Moreover, in Patent Literature 1, an optical switch appropriately switches transmission lines to be connected to one OTDR and the OTDR performs measurement on the switched transmission line. This method however has a problem that, when excess losses or breaks occur simultaneously in a plurality of transmission lines, one or more suspected locations thereof may be missed.

The present invention has been made to solve the above problems and has its object to provide a multi-degree monitoring apparatus that can solely monitor a plurality of transmission lines at the same time.

Solution to Problem

A multi-degree monitoring apparatus according to the present invention includes: a light source to output pulsed light; an optical splitter with a plurality of ports, to split the pulsed light output from the light source and output the split pulsed light from each of the plurality of ports; a plurality of variable optical attenuators each connected to a corresponding one of the ports of the optical splitter, to attenuate and output the pulsed light input from the optical splitter; a plurality of optical couplers each of whose port at one end side is connected to output of a corresponding one of the variable optical attenuators and each of whose port at another end side is connected to one end of a corresponding one of a plurality of transmission lines to be measured; a light receiving element to receive backscattered light from the one end of each of the transmission lines; and processing circuitry to individually control each of the variable optical attenuators, and to perform abnormality detection on each of the transmission lines from a result of light reception by the light receiving element, wherein the processing circuitry performs a first process of setting an attenuation of each of all the variable optical attenuators to a minimum value and of causing the light source to output the pulsed light, generates first waveform data indicating a temporal change in intensity of the backscattered light from a result of light reception by the light receiving element after the first process, and determines presence or absence of a reflection point from the first waveform data, performs a second process of switching the attenuation of each of the variable optical attenuators to a maximum value in turn, when it is determined that a reflection point exists, and of causing the light source to output the pulsed light every time the attenuation is switched, and generates second waveform data indicating a temporal change in intensity of the backscattered light from a result of light reception by the light receiving element after the second process, and identifies, among the transmission lines, a transmission line suspected of having an abnormality by comparing the second waveform data with the first waveform data.

Advantageous Effects of Invention

According to the present invention, with the configuration described above, the single apparatus can monitor the plurality of transmission lines at the same time.

DESCRIPTION OF EMBODIMENTS

Hereinafter, embodiments of the present invention will be described in detail with reference to the drawings.

First Embodiment

Figure 1:
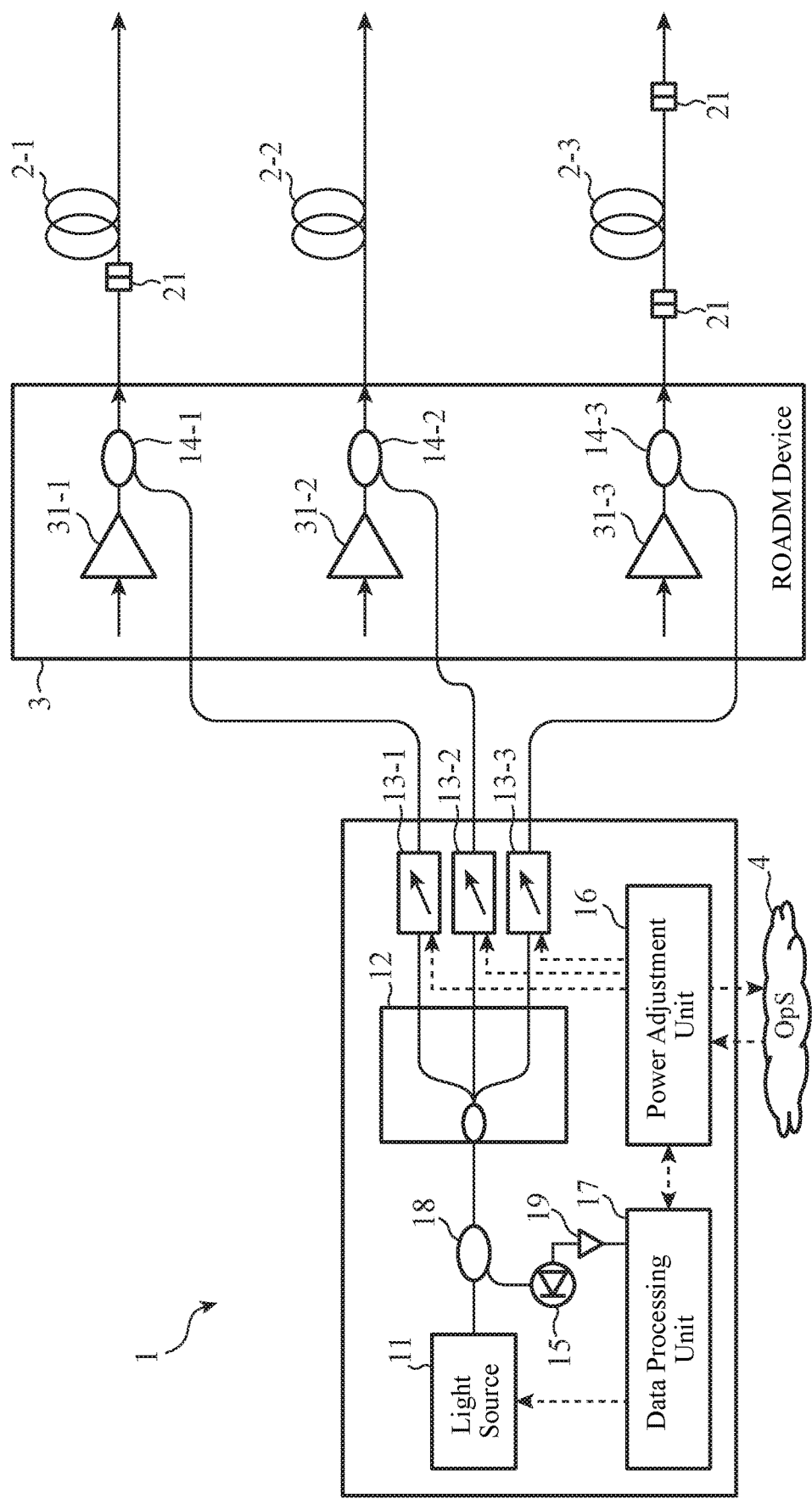
FIG. 1 is a diagram illustrating an example of a configuration of a multi-degree monitoring apparatus according to a first embodiment of the present invention.

FIG. 1 is a diagram illustrating an example of a configuration of a multi-degree monitoring apparatus 1 according to a first embodiment of the present invention.

The multi-degree monitoring apparatus 1 monitors a plurality of transmission lines 2 to be measured. Note that the transmission lines 2 are optical fibers, and FIG. 1 illustrates a case where three of the transmission lines 2 (transmission lines 2-1 to 2-3) are to be measured. Moreover, the following illustrates a case where a multi-degree WDM system is a reconfigurable optical add/drop multiplexer (ROADM) system, the multi-degree monitoring apparatus 1 is provided for each ROADM device 3 included in the ROADM system, and the multi-degree monitoring apparatus 1 monitors the plurality of transmission lines 2 connected to the ROADM device 3. Note that a reference numeral 21 denotes a connector.

As illustrated in FIG. 1, the multi-degree monitoring apparatus 1 includes a light source 11, an optical splitter 12, a plurality of variable optical attenuators (VOAs) 13, a plurality of optical couplers 14, a light receiving element 15, a power adjustment unit 16, and a data processing unit 17. Note that the VOA 13 and the optical coupler 14 are provided for each of the transmission lines 2 to be measured by the multi-degree monitoring apparatus 1. The multi-degree monitoring apparatus 1 is also connected to an operating system (OpS) 4. The OpS 4 is remotely located with respect to the multi-degree monitoring apparatus 1, for example.

The light source 11 outputs pulsed light.

The optical splitter 12 has one first port and a plurality of second ports, the first port is connected to the light source 11, and the second ports are connected to the respective VOAs 13. FIG. 1 illustrates a case where the optical splitter 12 has three of the second ports. The optical splitter 12 splits the pulsed light input from the light source 11 to the first port, and outputs the split pulsed light from each of the second ports. The optical splitter 12 also combines backscattered light input from the VOAs 13 to their respective second ports, and outputs the combined backscattered light from the first port. Note that the backscattered light output from the first port of the optical splitter 12 is input to the light receiving element 15 via an optical coupler 18.

The VOA 13 attenuates and outputs the pulsed light input from the optical splitter 12. FIG. 1 illustrates a case where three of the VOAs 13 (VOAs 13-1 to 13-3) are provided in the multi-degree monitoring apparatus 1.

The optical coupler 14 has two first ports and one second port, one of the first ports is connected to one of amplifier units 31 included in the ROADM device 3, the other one of the first ports is connected to the VOA 13, and the second port is connected to one end of the transmission line 2. Note that the amplifier unit 31 outputs wavelength division multiplexed light (WDM light) that is service light used in the ROADM system. FIG. 1 illustrates a case where the ROADM device 3 has three of the amplifier units 31 (amplifier units 31-1 to 31-3). The optical coupler 14 outputs the WDM light which is input from the amplifier unit 31 to the one first port, and the pulsed light which is input from the VOA 13 to the other first port, from the second port. The optical coupler 14 also outputs the backscattered light which is input from the transmission line 2 to the second port, from the other first port. FIG. 1 illustrates a case where three of the optical couplers 14 (optical couplers 14-1 to 14-3) are provided for the multi-degree monitoring apparatus 1.

The light receiving element 15 receives the backscattered light input from the optical coupler 18, and converts the backscattered light into an electric signal corresponding to the intensity of the received light. The electric signal obtained by the light receiving element 15 is amplified by an amplifier unit 19 and then input to the data processing unit 17.

The power adjustment unit 16 controls the VOAs 13 individually. Note that an initial value of an attenuation (ATT value) in each of the VOAs 13 controlled by the power adjustment unit 16 is set by the OpS 4.

Figure 2:
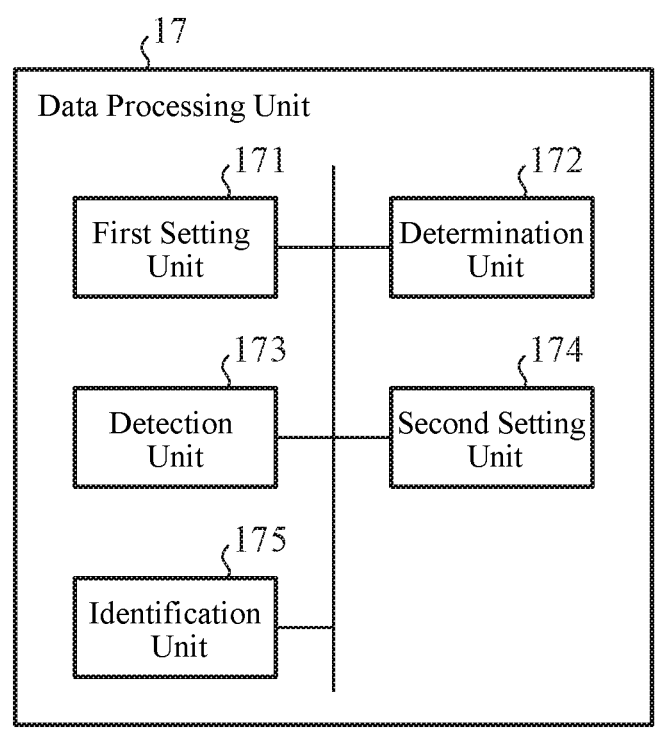
FIG. 2 is a diagram illustrating an example of a configuration of a data processing unit in the first embodiment of the present invention.

The data processing unit 17 performs abnormality detection on each of the transmission lines 2 from a result of light reception by the light receiving element 15. Note that the abnormality in the transmission line 2 includes an excess loss due to connector connection or fiber fusion splicing in the transmission line 2, or a break in the transmission line 2. The data processing unit 17 includes, as illustrated in FIG. 2, a first setting unit 171, a determination unit 172, a detection unit 173, a second setting unit 174, and an identification unit 175.

The first setting unit 171 causes the power adjustment unit 16 to set the attenuation of each of all the VOAs 13 to the minimum value, and causes the light source 11 to output pulsed light.

After the processing by the first setting unit 171, the determination unit 172 generates first waveform data indicating a temporal change in the intensity of the backscattered light from the result of light reception by the light receiving element 15, and determines the presence or absence of a reflection point from the first waveform data. Note that the determination unit 172 may use, as the first waveform data, data indicating a relationship between the intensity of the backscattered light and the distance from one end of each of the transmission lines 2, the data being obtained by converting data indicating the temporal change in the intensity of the backscattered light, on the basis of the speed of the pulsed light and a group refractive index of each of the optical fibers being the transmission lines 2. The determination unit 172 also sets in advance a threshold corresponding to a reception time (or the distance from one end of the transmission line 2), for the intensity of the backscattered light. Then, the determination unit 172 extracts a discontinuous point from the first waveform data, compares the intensity at the discontinuous point with a corresponding threshold, and detects, as the reflection point, the discontinuous point with the intensity higher than or equal to the threshold.

When the determination unit 172 determines that the reflection point exists, the detection unit 173 detects the transmission line 2 shorter than the distance to the reflection point among the transmission lines 2, on the basis of transmission line length data notified from the OpS 4 and indicating the length of each of the transmission lines 2. Note that the detection unit 173 is unnecessary when the transmission line length data is not notified from the OpS 4.

When the determination unit 172 determines that the reflection point exists, the second setting unit 174 causes the power adjustment unit 16 to switch the attenuation of each of the VOAs 13 to the maximum value in turn, and causes the light source 11 to output the pulsed light each time the power adjustment unit 16 switches the attenuation. Note that when the detection unit 173 detects the transmission line 2 shorter than the distance to the reflection point, the second setting unit 174 excludes the VOA 13 corresponding to the detected transmission line 2 among the VOAs 13 from the target whose attenuation is to be switched by the power adjustment unit 16.

After the processing by the second setting unit 174, the identification unit 175 generates second waveform data indicating a temporal change in the intensity of the backscattered light from the result of light reception by the light receiving element 15, and identifies the transmission line 2 suspected of having an abnormality among the transmission lines 2 by comparing the second waveform data with the first waveform data. Note that the identification unit 175 may use, as the second waveform data, data indicating a relationship between the intensity of the backscattered light and the distance from one end of each of the transmission lines 2, the data being obtained by converting data indicating the temporal change in the intensity of the backscattered light, on the basis of the speed of the pulsed light and the group refractive index of each of the optical fibers being the transmission lines 2. Also at this time, the identification unit 175 determines whether the reflection point in the first waveform data has disappeared in the second waveform data, and then if the reflection point has disappeared, identifies the transmission line 2 corresponding to the VOA 13 whose attenuation has been switched by the power adjustment unit 16 at that time, as the transmission line 2 that is suspected of having an abnormality.

Note that the data processing unit 17 can notify the OpS 4, via the power adjustment unit 16, of the identified transmission line 2 that is suspected of having an abnormality and information indicating the position of the reflection point in the transmission line 2. As a result, an operator who operates the OpS 4 can check the transmission line 2 suspected of having an abnormality and the location of the abnormality in the transmission line 2.

Figure 3:
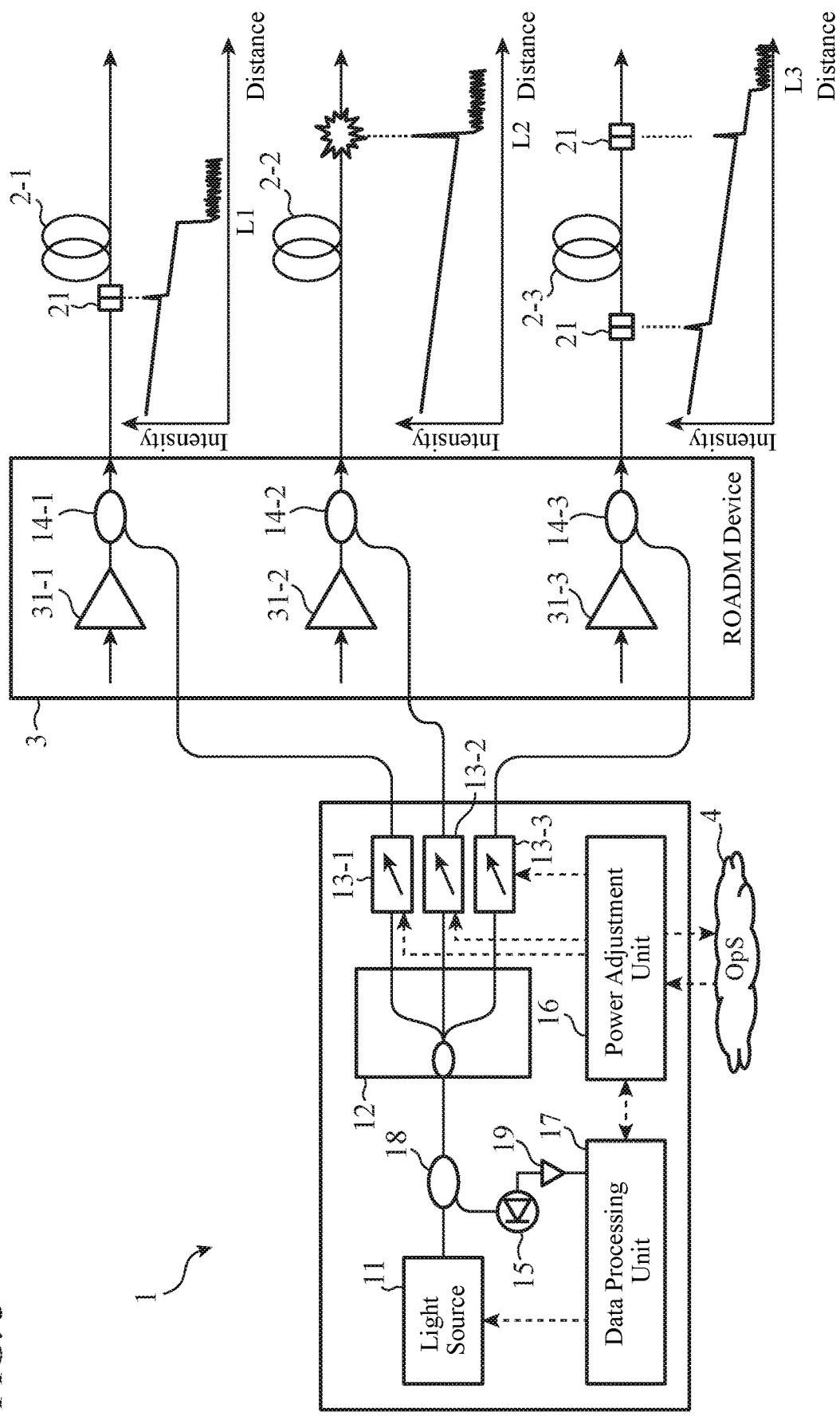
FIG. 3 is a diagram illustrating an example of a state of each transmission line monitored by the multi-degree monitoring apparatus according to the first embodiment of the present invention.

Next, an example of an operation of the multi-degree monitoring apparatus 1 according to the first embodiment will be described with reference to FIGS. 3 to 6. Note that the following assumes that the multi-degree monitoring apparatus 1 has been notified of the transmission line length data from the OpS 4. Also, as illustrated in FIG. 3, the following illustrates a case where a break has occurred in the second transmission line 2-2. It is also assumed in FIG. 3 that a loss due to connector connection in each of the transmission lines 2-1 and 2-3 falls within an allowable range of the communication performance.

Figure 6:
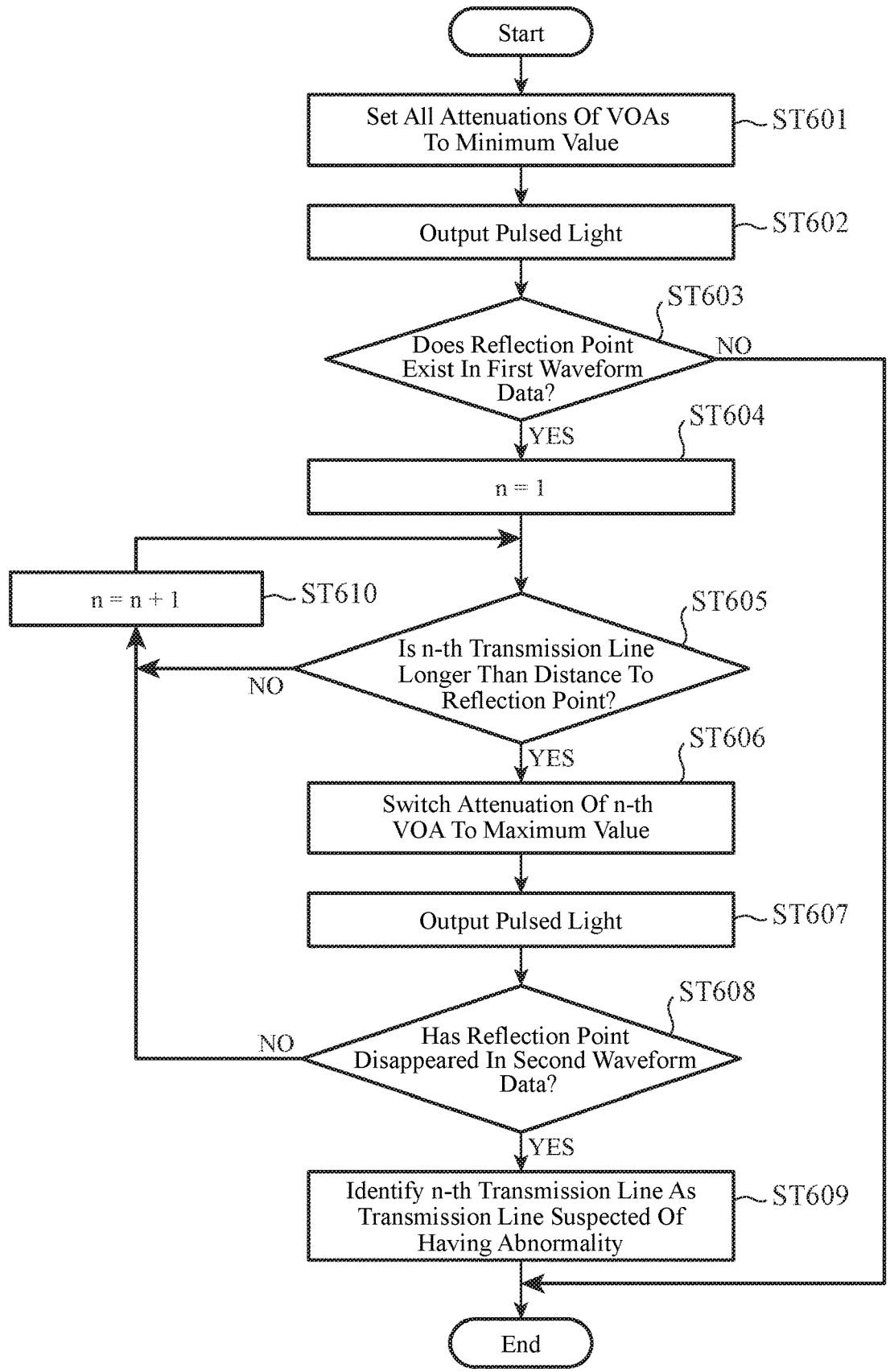
FIG. 6 is a flowchart illustrating an example of an operation of the multi-degree monitoring apparatus according to the first embodiment of the present invention.

In an example of the operation of the multi-degree monitoring apparatus 1, as illustrated in FIG. 6, the first setting unit 171 first causes the power adjustment unit 16 to set the attenuation of each of all the VOAs 13 to the minimum value (step ST601). The power adjustment unit 16 sets the attenuation of each of all the VOAs 13 to the minimum value in accordance with the instruction from the first setting unit 171.

Next, the first setting unit 171 causes the light source 11 to output pulsed light (step ST602). The light source 11 outputs the pulsed light in accordance with the instruction from the first setting unit 171.

Then, the pulsed light output from the light source 11 is split in equal power ratio by the optical splitter 12, and the split pulsed light is input to each of the VOAs 13. The pulsed light is then attenuated by the each of the VOAs 13 and thereafter input to one end of a corresponding one of the transmission lines 2 via a corresponding one of the optical couplers 14. Note that, here, the attenuation of each of all the VOAs 13 is set to the minimum value, so that the pulsed light is not attenuated.

Then, the pulsed light input to the one end of the corresponding transmission line 2 generates backscattered light backward while traveling through the transmission line 2. The backscattered light returns to the one end of the transmission line 2 and is input to the optical splitter 12 via the corresponding optical coupler 14 and the corresponding VOA 13. Then, the backscattered light having returned from the each of the transmission lines 2 is combined by the optical splitter 12, and the combined backscattered light is input to the light receiving element 15 via the optical coupler 18. The light receiving element 15 then receives the backscattered light, and converts the received backscattered light into an electric signal corresponding to the intensity of the received light. The electric signal obtained by the light receiving element 15 is input to the data processing unit 17 via the amplifier unit 19.

Note that the backscattered light is also output from the one of the first ports of the optical coupler 14. Therefore, in the multi-degree monitoring apparatus 1, an optical filter for removing the backscattered light may be installed to the first port as needed.

Next, the determination unit 172 generates first waveform data indicating a temporal change in the intensity of the backscattered light from the result of light reception by the light receiving element 15, and determines whether a reflection point exists in the first waveform data (step ST603). At this time, the determination unit 172 extracts a discontinuous point from the first waveform data, compares the intensity at the discontinuous point with a corresponding threshold, and detects, as the reflection point, the discontinuous point with the intensity higher than or equal to the threshold.

Figure 4A:
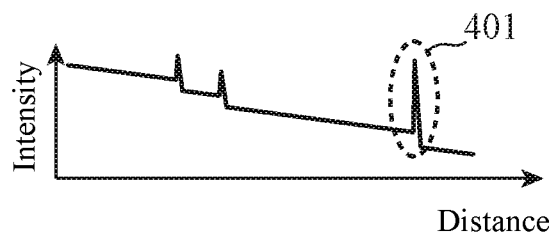
FIGS. 4A and 4B are graphs respectively illustrating examples of first waveform data and second waveform data obtained by the multi-degree monitoring apparatus according to the first embodiment of the present invention.

FIG. 4A illustrates an example of the first waveform data. The first waveform data indicates a result of combining the characteristics of the transmission lines 2 as illustrated in FIGS. 3 and 4A. Moreover, the first waveform data illustrated in FIG. 4A is obtained, by converting the data indicating the temporal change in the intensity of the backscattered light into data indicating a relationship between the intensity of the backscattered light and the distance from one end of each of the transmission lines 2, on the basis of the speed of the pulsed light and the group refractive index of each of the optical fibers being the transmission lines 2. A reference numeral 401 illustrated in FIG. 4A indicates the location of a reflection point.

If the determination unit 172 determines in step ST603 that no reflection point exists, the multi-degree monitoring apparatus 1 determines that each of the transmission lines 2 is not suspected of having an abnormality and ends the sequence.

On the other hand, if the determination unit 172 determines in step ST603 that a reflection point exists, the multi-degree monitoring apparatus 1 sets "n" to "1" (step ST604).

Next, the detection unit 173 determines whether an n-th transmission line 2 is longer than the distance to the reflection point on the basis of the transmission line length data (step ST605).

If the detection unit 173 determines in step ST605 that the n-th transmission line 2 is longer than the distance to the reflection point, the second setting unit 174 causes the power adjustment unit 16 to switch the attenuation of an n-th VOA 13 to the maximum value (step ST606). The power adjustment unit 16 switches the attenuation of only the n-th VOA 13 to the maximum value in accordance with the instruction from the second setting unit 174.

Next, the second setting unit 174 causes the light source 11 to output pulsed light (step ST607). The light source 11 outputs the pulsed light in accordance with the instruction from the second setting unit 174. The subsequent flow path of light from the optical splitter 12 to the light receiving element 15 is similar to the flow path of light from the optical splitter 12 to the light receiving element 15 after step ST602. Note that, here, the attenuation of only the n-th VOA 13 is set to the maximum value, so that only the pulsed light input to the n-th VOA 13 is attenuated.

Figure 4B:
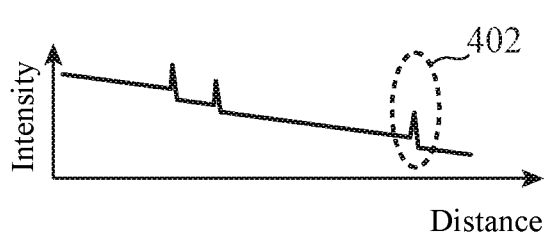

Next, the identification unit 175 generates second waveform data indicating a temporal change in the intensity of the backscattered light from the result of light reception by the light receiving element 15, compares the second waveform data with the first waveform data, and determines whether the reflection point in the first waveform data has disappeared (step ST608). At this time, the identification unit 175 determines whether the reflection point has disappeared, by determining whether the intensity at the reflection point in the first waveform data has changed less than the threshold in the second waveform data. FIG. 4B illustrates an example of the second waveform data. As illustrated in FIG. 4B, the second waveform data indicates a result of combining the characteristics of the remaining transmission lines 2 excluding the characteristic of the n-th transmission line 2 (the second transmission line 2-2 in FIG. 4B). Note that the second waveform data illustrated in FIG. 4B is obtained, by converting the data indicating the temporal change in the intensity of the backscattered light into data indicating a relationship between the intensity of the backscattered light and the distance from one end of each of the transmission lines 2, on the basis of the speed of the pulsed light and the group refractive index of each of the optical fibers being the transmission lines 2. Moreover, a reference numeral 402 illustrated in FIG. 4B indicates the location of the reflection point in FIG. 4A.

If determining in step ST608 that the reflection point has disappeared, the identification unit 175 identifies the n-th transmission line 2 as the transmission line 2 suspected of having an abnormality (step ST609). In FIG. 4, the power adjustment unit 16 switches the attenuation of the second VOA 13-2 to the maximum value, so that the identification unit 175 can identify a large change in the intensity at the reflection point from the first waveform data and the second waveform data and thus determine that the reflection point exists on the second transmission line 2-2.

Moreover, if the detection unit 173 determines in step ST605 that the n-th transmission line 2 is shorter than the distance to the reflection point, or if the identification unit 175 determines in step ST608 that the reflection point has not disappeared, the multi-degree monitoring apparatus 1 increments "n" (step ST610). The sequence thereafter returns to step ST605.

Figure 5:
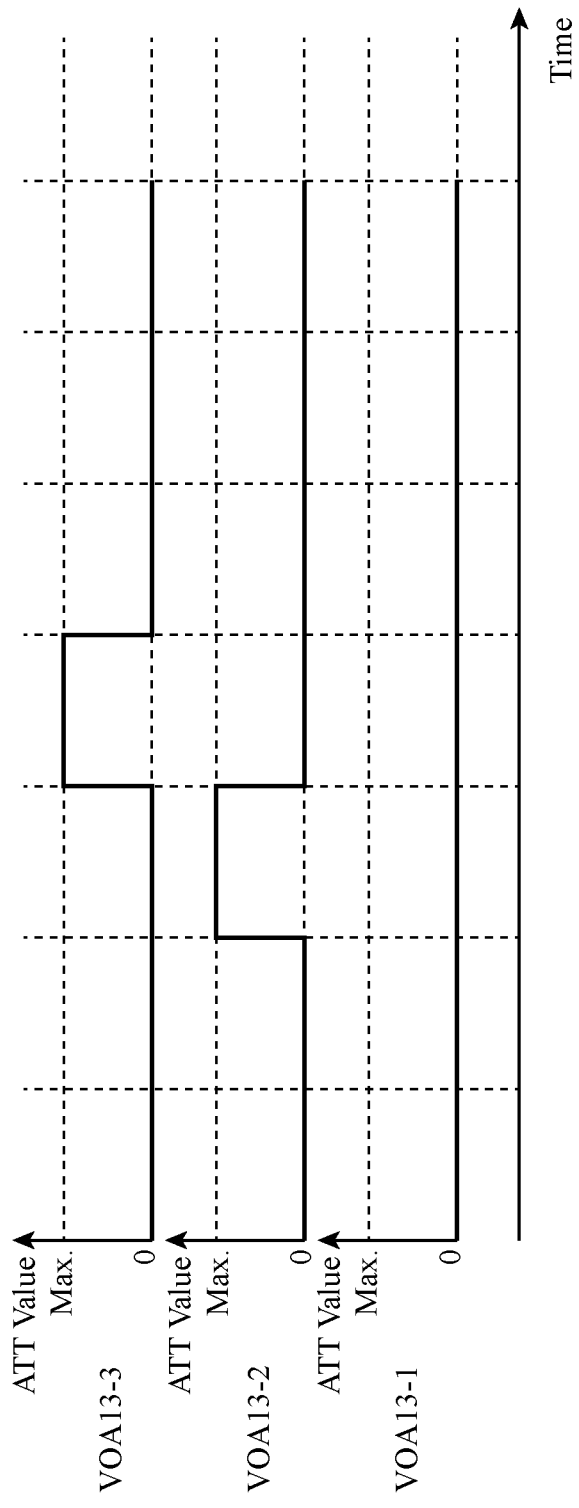
FIG. 5 is a timing diagram illustrating an example of an operation of a power adjustment unit and VOAs in the first embodiment of the present invention.

If the transmission line 2 is shorter than the distance to the reflection point, the reflection point does not exist on the transmission line 2. Therefore, when knowing the length of each of the transmission lines 2 in advance, the multi-degree monitoring apparatus 1 can narrow down the VOA 13 whose attenuation is to be switched by the power adjustment unit 16 as illustrated in FIG. 5. In the examples of FIGS. 3 and 5, a length L1 of the first transmission line 2-1 is shorter than a distance L2 to the reflection point, whereby the second setting unit 174 excludes the first VOA 13-1 from the target whose attenuation is to be switched. As a result, the multi-degree monitoring apparatus 1 can reduce the time required for identifying the transmission line 2 suspected of having an abnormality.

Next, effects of the multi-degree monitoring apparatus 1 according to the first embodiment will be described.

The multi-degree monitoring apparatus 1 according to the first embodiment can solely monitor the plurality of transmission lines 2 at the same time, by including the optical splitter 12 and the plurality of VOAs 13. This as a result can reduce the time required for the OTDR measurement on the plurality of transmission lines 2 and reduce the cost of the apparatus.

Moreover, the multi-degree monitoring apparatus 1 first performs the OTDR measurement on the transmission lines 2 collectively, with the attenuation of each of all the VOAs 13 being set to the minimum value, and detects the presence or absence of a reflection point on the transmission lines 2 as a whole. Then, when detecting a reflection point, the multi-degree monitoring apparatus 1 switches the attenuation of each of the VOAs 13 to the maximum value in turn, and collectively performs the OTDR measurement on the remaining transmission lines 2 excluding one of the transmission lines 2, thereby identifying the transmission line 2 on which the reflection point exists. The multi-degree monitoring apparatus 1 can thus identify the transmission line 2 on which the reflection point exists even when a plurality of discontinuous points exists at the same position as the reflection point.

Moreover, when having acquired the transmission line length data indicating the length of each of the transmission lines 2, the multi-degree monitoring apparatus 1 can narrow down the VOA 13 whose attenuation is to be switched by the power adjustment unit 16, on the basis of the transmission line length data. As a result, the multi-degree monitoring apparatus 1 can further reduce the time (identification time) required for identifying the transmission line 2 suspected of having an abnormality.

Figure 7:
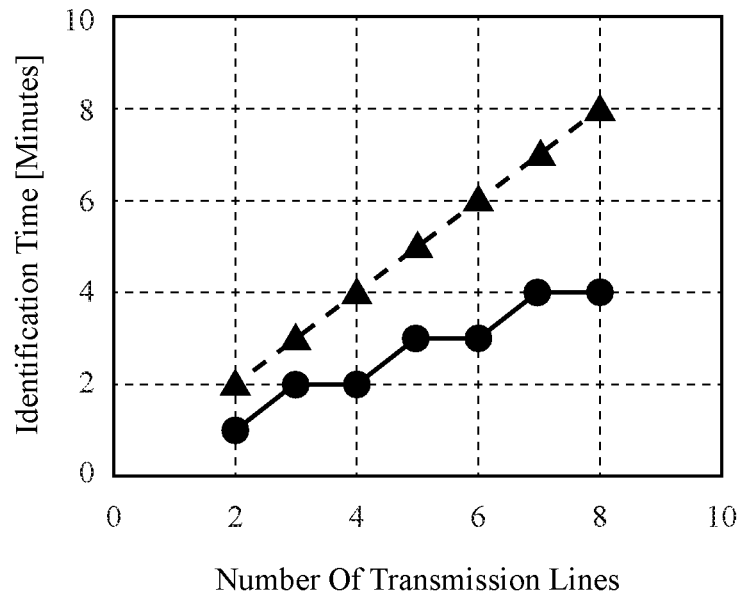
FIG. 7 is a graph illustrating an effect of the multi-degree monitoring apparatus according to the first embodiment of the present invention.

FIG. 7 illustrates a difference in the identification time between a case where the VOA 13 whose attenuation is to be switched is not narrowed down (broken line) and a case where the narrowing down is performed (solid line) for each number of the transmission lines 2 to be measured. FIG. 7 illustrates a case where the light source 11 emits light for one minute, and half of the transmission lines 2 to be measured are shorter than the distance to the reflection point. As illustrated in FIG. 7, it can be seen that, as the number of transmission lines 2 to be measured increases, the multi-degree monitoring apparatus 1 has an increased effect of reduction in the identification time by narrowing down the VOA 13 whose attenuation is to be switched.

As described above, according to the first embodiment, the multi-degree monitoring apparatus 1 includes: the light source 11 that outputs the pulsed light; the optical splitter 12 that splits the pulsed light output from the light source 11 and outputs the split pulsed light from each of the plurality of second ports; the plurality of VOAs 13 each of which is connected to a corresponding one of the second ports of the optical splitter 12 and attenuates and outputs the pulsed light input from the corresponding optical splitter 12; the plurality of optical couplers 14 each of whose first port is connected to the output of a corresponding one of the VOAs 13 and each of whose second port is connected to one end of a corresponding one of the plurality of transmission lines 2 to be measured; the light receiving element 15 that receives the backscattered light from the one end of each of the transmission lines 2; the power adjustment unit 16 that individually controls each of the VOAs 13; and the data processing unit 17 that performs abnormality detection on each of the transmission lines 2 from the result of light reception by the light receiving element 15. Therefore, the multi-degree monitoring apparatus 1 according to the first embodiment can solely monitor the plurality of transmission lines 2 at the same time.

Second Embodiment

Figure 8:
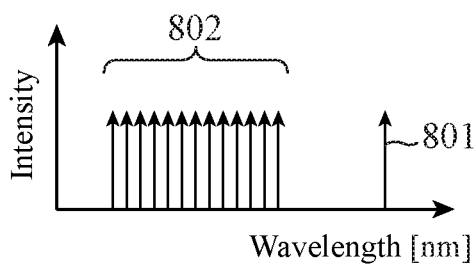
FIG. 8 is a graph illustrating an example of a wavelength of pulsed light output from a light source in a second embodiment of the present invention.

The first embodiment makes no mention of the wavelength of the pulsed light output from the light source 11. In contrast, as illustrated in FIG. 8, for example, the wavelength of pulsed light 801 output from the light source 11 may be different from the wavelength range of WDM light 802 that is a main signal transmitted through each of the transmission lines 2 to be measured.

Note that an example of a configuration and an example of an operation of the multi-degree monitoring apparatus 1 according to a second embodiment will not be described, because they are similar to the example of the configuration and the example of the operation of the multi-degree monitoring apparatus 1 according to the first embodiment.

As described above, the multi-degree monitoring apparatus 1 sets the wavelength of the pulsed light emitted from the light source 11 to be different from the wavelength range of the WDM light, thereby being able to monitor the transmission lines 2 even while the ROADM device 3 is in service.

Note that when the multi-degree monitoring apparatus 1 monitors the transmission lines 2 while the ROADM device 3 is in service, the backscattered light generated by the service light input to the transmission lines 2 can affect the monitoring of the transmission lines 2 by the multi-degree monitoring apparatus 1. Thus, in the multi-degree monitoring apparatus 1, an optical filter that allows the transmission of only the wavelength of the pulsed light may be installed on a path between the optical coupler 18 and the amplifier unit 19, for example. The multi-degree monitoring apparatus 1 can thus inhibit the influence of the backscattered light due to the service light.

As described above, according to the second embodiment, the pulsed light emitted from the light source 11 has the wavelength outside the wavelength range of the WDM light transmitted through the transmission lines 2. As a result, in addition to the effects of the first embodiment, the multi-degree monitoring apparatus 1 according to the second embodiment can monitor the transmission lines 2 at all times without affecting the WDM light transmitted through each of the transmission lines 2.

Lastly, an example of a hardware configuration of each of the power adjustment unit 16 and the data processing unit 17 in the first and second embodiments will be described with reference to FIG. 9. Although an example of a hardware configuration of the data processing unit 17 will be described below, the similar applies to the power adjustment unit 16.

Figure 9A:
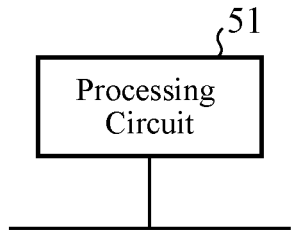
FIGS. 9A and 9B are diagrams each illustrating an example of a hardware configuration of the power adjustment unit and the data processing unit in the first and second embodiments of the present invention.
Figure 9B:
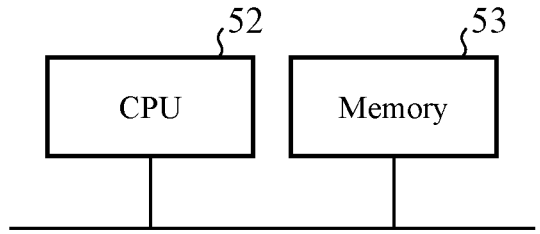

The function of each of the first setting unit 171, the determination unit 172, the detection unit 173, the second setting unit 174, and the identification unit 175 in the data processing unit 17 is implemented by a processing circuit 51. The processing circuit 51 may be dedicated hardware as illustrated in FIG. 9A, or may be a central processing unit (CPU) 52 that executes a program stored in a memory 53 as illustrated in FIG. 9B, the CPU being also referred to as a central processor, a processing unit, an arithmetic unit, a microprocessor, a microcomputer, a processor, or a digital signal processor (DSP).

When the processing circuit 51 is the dedicated hardware, the processing circuit 51 corresponds to, for example, a single circuit, a complex circuit, a programmed processor, a parallel-programmed processor, an application specific integrated circuit (ASIC), a field programmable gate array (FPGA), or a combination of those. The processing circuit 51 may individually or collectively implement the function of each of the first setting unit 171, the determination unit 172, the detection unit 173, the second setting unit 174, and the identification unit 175.

When the processing circuit 51 is the CPU 52, the functions of the first setting unit 171, the determination unit 172, the detection unit 173, the second setting unit 174, and the identification unit 175 are implemented by software, firmware, or a combination of software and firmware. The software and firmware are described as programs and stored in the memory 53. The processing circuit 51 implements the function of each unit by reading and executing the programs stored in the memory 53. That is, the data processing unit 17 includes the memory 53 for storing the programs that, when executed by the processing circuit 51, result in the execution of each step illustrated in FIG. 6, for example. It can also be said that these programs cause a computer to execute the procedures and methods related to the first setting unit 171, the determination unit 172, the detection unit 173, the second setting unit 174, and the identification unit 175. Here, the memory 53 corresponds to, for example, a non-volatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disc, a compact disc, a mini disc, a digital versatile disc (DVD), or the like.

Note that some of the functions of the first setting unit 171, the determination unit 172, the detection unit 173, the second setting unit 174, and the identification unit 175 may be implemented by dedicated hardware and some of the functions may be implemented by software or firmware. For example, the function of the first setting unit 171 can be implemented by the processing circuit 51 as the dedicated hardware, and the functions of the determination unit 172, the detection unit 173, the second setting unit 174, and the identification unit 175 can be implemented by the processing circuit 51 reading and executing the programs stored in the memory 53.

As described above, the processing circuit 51 can implement each of the above functions by hardware, software, firmware, or a combination thereof.

Note that the present invention can freely combine the embodiments, modify any component in the embodiments, or omit any component in the embodiments within the scope of the invention.

INDUSTRIAL APPLICABILITY

The multi-degree monitoring apparatus according to the present invention can solely monitor a plurality of transmission lines at the same time, and is suitable for use in a multi-degree monitoring apparatus that monitors a plurality of transmission lines, for example.

REFERENCE SIGNS LIST

1: multi-degree monitoring apparatus, 2: transmission line, 3: ROADM device, 4: OpS, 11: light source, 12: optical splitter, 13: VOA, 14: optical coupler, 15: light receiving element, 16: power adjustment unit, 17: data processing unit, 18: optical coupler, 19: amplifier unit, 21: connector, 31: amplifier unit, 51: processing circuit, 52: CPU, 53: memory, 171: first setting unit, 172: determination unit, 173: detection unit, 174: second setting unit, 175: identification unit

The invention claimed is:

1. A multi-degree monitoring apparatus comprising:
a light source to output pulsed light;
an optical splitter with a plurality of ports, to split the pulsed light output from the light source and output the split pulsed light from each of the plurality of ports;
a plurality of variable optical attenuators each connected to a corresponding one of the ports of the optical splitter, to attenuate and output the pulsed light input from the optical splitter;
a plurality of optical couplers each of whose port at one end side is connected to output of a corresponding one of the variable optical attenuators and each of whose port at another end side is connected to one end of a corresponding one of a plurality of transmission lines to be measured;
a light receiving element to receive backscattered light from the one end of each of the transmission lines; and
processing circuitry to individually control each of the variable optical attenuators, and
to perform abnormality detection on each of the transmission lines from a result of light reception by the light receiving element, wherein
the processing circuitry
performs a first process of setting an attenuation of each of all the variable optical attenuators to a minimum value and of causing the light source to output the pulsed light,
generates first waveform data indicating a temporal change in intensity of the backscattered light from a result of light reception by the light receiving element after the first process, and determines presence or absence of a reflection point from the first waveform data,
performs a second process of switching the attenuation of each of the variable optical attenuators to a maximum value in turn, when it is determined that a reflection point exists, and of causing the light source to output the pulsed light every time the attenuation is switched, and
generates second waveform data indicating a temporal change in intensity of the backscattered light from a result of light reception by the light receiving element after the second process, and identifies, among the transmission lines, a transmission line suspected of having an abnormality by comparing the second waveform data with the first waveform data.

2. The multi-degree monitoring apparatus according to claim 1, wherein
the processing circuitry
detects, among the transmission lines, a transmission line shorter than a distance to the reflection point, when it is determined that the reflection point exists, and
excludes, among the variable optical attenuators, a variable optical attenuator corresponding to the detected transmission line from a target whose attenuation is to be switched.

3. The multi-degree monitoring apparatus according to claim 1, wherein
the pulsed light output from the light source has a wavelength outside a wavelength range of wavelength division multiplexed light transmitted through the transmission lines.

* * * * *